United States Patent [19]

Pfeiffer

[11] 4,381,086

[45] Apr. 26, 1983

[54] SEAT BELT RETRACTOR STRUCTURE

[75] Inventor: Robert C. Pfeiffer, Sterling Heights, Mich.

[73] Assignee: Allied Corporation, Morris Township, Morris County, N.J.

[21] Appl. No.: 190,784

[22] Filed: Sep. 25, 1980

[51] Int. Cl.³ .................. A62B 35/00; B65H 75/48
[52] U.S. Cl. ....................... 242/107.4 R; 280/805; 297/471
[58] Field of Search ............. 242/107.4 R–107.4 E; 280/805, 806, 807, 808; 297/470–472, 476–478

[56] References Cited

U.S. PATENT DOCUMENTS

| | | | |
|---|---|---|---|
| 3,416,747 | 12/1968 | Stoffel | 242/107.4 B |
| 3,450,368 | 6/1969 | Glauser et al. | 242/107.4 B |
| 3,471,100 | 10/1969 | Arcari | 242/107.4 B |
| 3,632,055 | 1/1972 | Stoffel | 242/107.4 D |
| 3,765,700 | 10/1973 | Littmann | 297/471 |

Primary Examiner—John M. Jillions
Attorney, Agent, or Firm—Roger H. Criss; Robert H. Johnson

[57] ABSTRACT

A seat belt retractor in which the housing has differential structural integrity. The retractor frame has a rigid structure and contains the retraction and locking elements. A mounting flange is connected to the frame and is permitted to distort in a controlled fashion as a result of crash forces acting on the retractor, whereby the frame remains substantially undistorted.

3 Claims, 5 Drawing Figures

SEAT BELT RETRACTOR STRUCTURE

DESCRIPTION

FIELD OF THE INVENTION

This invention relates to seat belt retractor structures.

DESCRIPTION OF THE PRIOR ART

Conventional seat belt retractors include a retractor frame and a mounting flange formed as a one-piece construction. The retractor frame houses a spool of seat belt webbing as well as locking means which is designed to prevent protraction of the webbing from the retractor. In designing such retractors, one must take into account that in the event of high collision forces acting on the seat belt webbing, the locking means and other functional parts may be displaced from their proper relative positions as the result of the collision forces. This problem is becoming more pronounced in new car model designs as result of the down-sizing process which oftentimes requires that the seat belt retractor be located in non-traditional places in the vehicle. Unconventional retractor shapes can result from this effort, which are more susceptible to the above-mentioned problem.

It would be desirable if a seat belt retractor were provided in which the distribution of crash load forces were managed to alleviate such problem.

SUMMARY OF THE INVENTION

In accordance with this invention, there is provided a seat belt retractor for installation in a vehicle, comprising:

a frame;

winding means supported for movement in the frame in winding and unwinding directions;

locking means supported in said frame for locking the winding means against movement in the unwinding direction;

a restraint element connected to the winding means and movable towards and away from the frame as the winding means moves in its winding and unwinding directions, respectively; and mounting means connected to the frame for mounting the frame to the vehicle, the mounting means being capable of distortion as a result of forces acting on the winding means, and hence the mounting means, in a manner such that the frame remains substantially undistorted so as not to affect the integrity of the operable elements in said frame as a result of the forces.

Thus, the distribution of the crash load forces is managed by the present invention such that the frame, which carries the retractor reel and locking means, remains substantially undistorted while the mounting portion distorts in a controlled manner to relieve abnormal stresses from acting on the frame.

In a preferred embodiment, the retractor frame and mounting flange are formed as separate elements and as result of collision forces, the frame rotates with respect to the flange such that the frame remains substantially undistorted.

DESCRIPTION OF THE PREFERRED EMBODIMENTS

Figure 1:
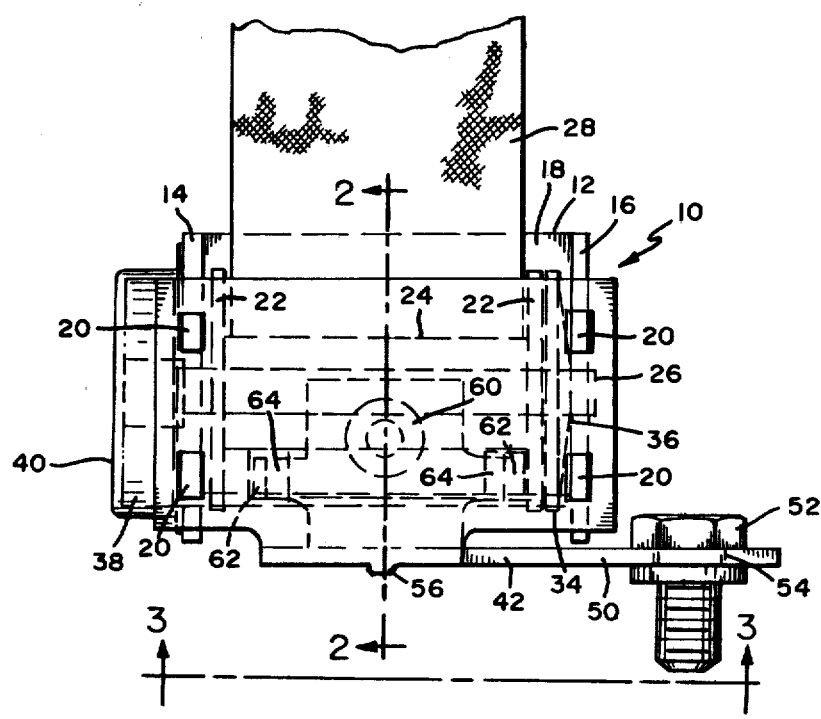
FIG. 1 is a side view of the seat belt retractor of this invention.
Figure 2:
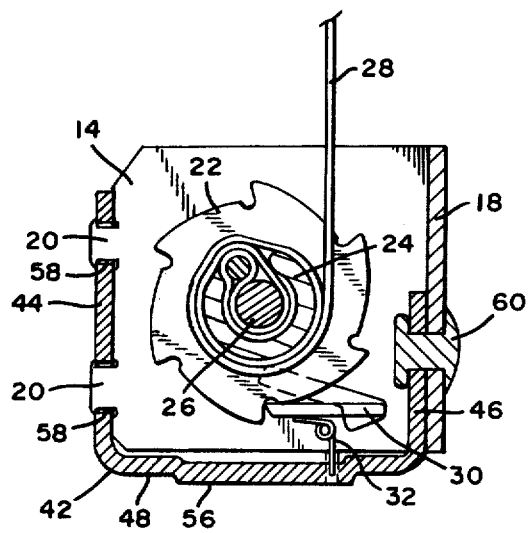
FIG. 2 is a view taken along line 2—2 of FIG. 1.
Figure 3:
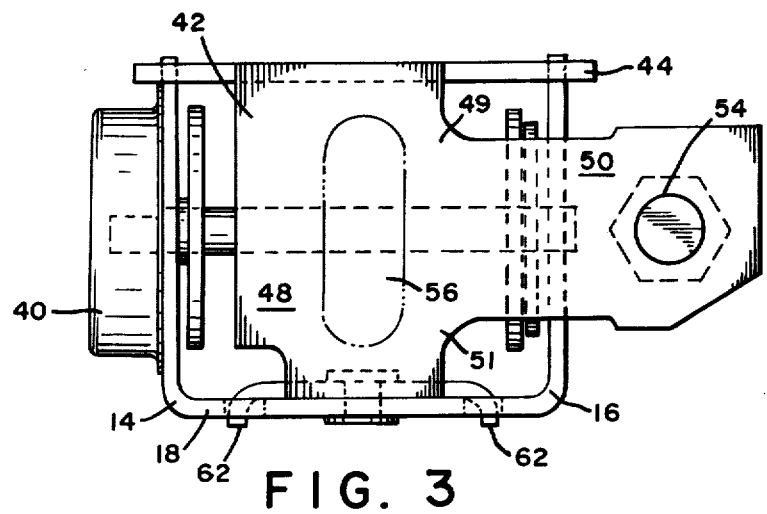
FIG. 3 is a plan view of the bottom of the retractor of FIG. 1 taken along line 3—3 (and shown without the mounting bolt).

With reference to FIGS. 1-3, there is shown a seat belt retractor, generally indicated at 10, including a frame 12 having a generally U-shape and including side flanges 14, 16 and a base portion 18. Extending from the edges of side flanges 14, 16 are four edge tabs 20. A conventional gear and tube assembly in the form of ratchet wheels 22 and tube 24 is supported by shaft 26 which is journalled for rotation in openings in side flanges 14, 16. Seat belt webbing 28 is wound up on tube 24. A conventional lock dog 30 is pivotably mounted in slots formed in side flanges 14, 16 and is biased towards locking engagement with the teeth of ratchet wheels 22 by spring 32. A conventional clutch 34 is rotatable on shaft 26 and is urged against ratchet wheel 22 by spring 36. Clutch 34 prevents engagement of lock dog 30 with the teeth of ratchet wheels 22 as webbing is extracted from the fully wound condition and until the webbing is partially rewound by the bias of a conventional rewind spring 38 attached to shaft 26 and contained within cap 40. The retractor as depicted is commonly known as an auto-locking retractor and is typically utilized for rear seat applications. However, it is to be understood that the present invention is also applicable to emergency locking retractors which only lock upon a rapid deceleration of the vehicle and/or a rapid withdrawal of the webbing from the retractor.

A mounting flange 42 is connected to frame 12 for mounting the retractor to the vehicle. Flange 42 includes an upstanding flange 44 which bridges side flanges 14, 16 of frame 12 opposite base portion 18 and a smaller upstanding flange 46 opposite flange 44. A base portion 48 bridges flanges 44, 46 and extends laterally to form a mounting tab 50 for mounting to the vehicle via bolt 52 extending through opening 54. The width of base portion 48 is reduced in the areas of 49, 51 to provide mounting tab 50 with a reduced width. Such a reduced width permits control of the distortion forces acting on tab 50 during a collision. It should be noted that flange 50 is spaced somewhat from the bottom of flange 16 of frame 12. Base portion 48 is provided with a lateral rib 56 to better control the location of the distortion and to space the retractor from the vehicle floor. Flange 44 is provided with four slots 58 which receive the four tabs 20 of frame 12. Tabs 20 may be staked in place to provide additional unity to the assembly. Flange 46 of mounting flange 42 is attached to base portion 18 of frame 12 by a rivet 60 or the like. Mounting tabs in the form of laterally extending arms 62 bent outwards from the main portion of flange 46 adjacent rivet 60 (shown in phantom in FIG. 1) extend through slots 64 formed in base portion 18 of frame 12 to provide additional integrity during load transfer by resisting rotation of the elements.

Figure 4:
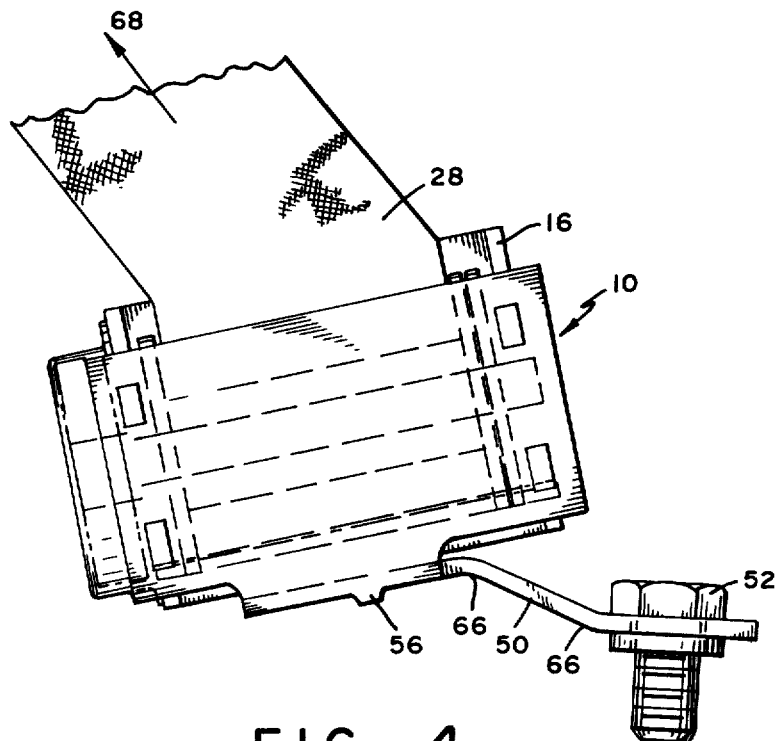
FIG. 4 is a view of the seat belt retractor of FIG. 1 after being subjected to crash loads.

Referring now to FIG. 4, in the event of a collision or rapid deceleration of the vehicle, the occupant will exert a force against webbing 28. This crash force is transmitted to frame 12 via lock dog 30 and thence to mounting flange 42 by the interconnection provided by rivet 60 and ears 20. Mounting tab 50 transfers this force to the vehicle via bolt 52. In the event of relatively high crash forces, mounting tab 50 is deformed in the area of 66 in front of rib 56. Under such conditions, the tendency is for the plane of webbing 28 to become loaded in direction 68 as a result of the crash forces, with the axis of shaft 26 being substantially perpendicular to such pull direction. As is apparent from FIG. 4, frame 12 remains substantially undeformed so that additional loads may be transferred from the webbing to the lock dog, frame and thence to the mounting flange 42. In this manner, the integrity of the internal components of the retractor is maintained and lock dog 30 remains effective up to its designed load limits to transfer crash forces to the vehicle.

Figure 5:
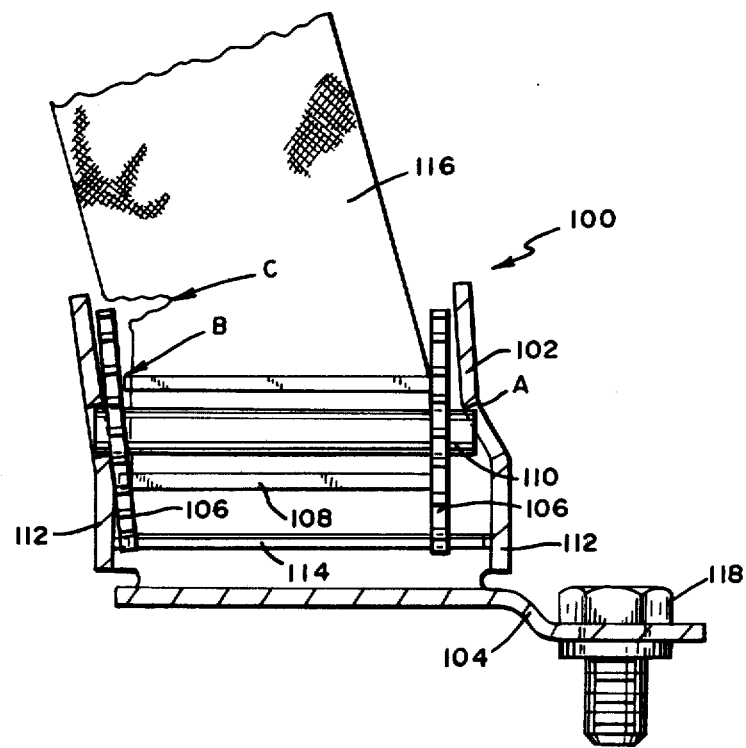
FIG. 5 is a view of a prior art seat belt retractor after being subjected to similar crash loads.

Referring to FIG. 5, a prior art type conventional retractor 100 is shown subsequent to the imposition of similar crash forces as in FIG. 4. Retractor 100 includes a frame 102 and a mounting flange 104 formed as a one-piece construction. Retractor 100 includes a similar gear and tube assembly in the form of ratchet wheels 106 and tube 108 mounted on shaft 110 which is supported in side flanges 112. Lock dog 114 is engageable with the teeth of ratchet wheels 106 and webbing 116 is connected to tube 108. Retractor 100 is mounted to the vehicle by bolt 118 which extends through mounting flange 104.

As a result of crash forces imposed on webbing 116, any distortion which is experienced in the frame and mounting flange of retractor 100 directly affects the integrity of the internal components. As can be seen, side flanges 112 of frame 102 have deformed and the internal components have been displaced. The primary modes of failure experienced are shown in FIG. 5 as A, B, and C. Mode A results from sufficient distortion such that shaft 110 is disengaged from frame 102. Mode B occurs when the distortion is such that ratchet wheels 106 are separated from tube 108. Mode C occurs when webbing 116 is forced over the top of ratchet wheels 106 with sufficient force to cause tearing in the webbing. In this retractor design, there is little distortion in the mounting flange but unacceptably high distortion in the retractor frame.

The retractor of FIGS. 1–4 is intended for installation in a vehicle such that the longitudinal axis of shaft 26 is substantially parallel to the longitudinal axis of the vehicle as viewed from above. As indicated earlier, such a location is necessitated in certain new car designs due to spacing requirements. In a more conventional installation, the retractor would be mounted such that the longitudinal axis of the shaft is substantially perpendicular to the longitudinal axis of the vehicle. In the latter case, the shaft is substantially parallel to the direction of the crash load imposed on the seat belt webbing and hence the frame is not subject to unacceptable distortion forces. However, in the present case the longitudinal axis of the shaft is substantially perpendicular to the direction of the crash load forces acting on the webbing (i.e., direction 68) which otherwise would result in unacceptable distortion of the frame.

Moreover, the location of mounting flange 42 substantially parallel to the longitudinal axis of the vehicle likewise may be necessitated by spacing requirements, in distinction to a more conventional approach wherein the flange is substantially perpendicular to such axis. As a result of the former location, additional distortion forces act on the retractor since the mounting flange is substantially perpendicular to the direction of the crash load forces acting on the webbing.

The present invention is particularly suitable to the above-mentioned design in which deformation forces are enhanced, but this invention is likewise applicable to designs in which the mounting flange or shaft is located other than substantially parallel to the longitudinal axis of the vehicle.

Although as described above the retractor preferably is in a two-piece construction, this invention is also useful for one-piece constructions wherein the mounting flange is constructed so as to deform in a manner described above. Additionally, the mounting flange may be constructed to absorb some of the crash loads, thereby providing an energy absorbing retractor.

As can be seen from the above, the seat belt retractor of the present invention includes a housing that has differential structural integrity. The retractor frame, which houses the retraction and locking elements, has a rigid structure to maintain the components in their correct functional positions and the mounting portion is capable of controlled distortion.

It is to be understood that variations in the modifications of the present invention may be made without departing from the scope thereof. It is also to be understood that the present invention is not to be limited by the specific embodiments disclosed herein but only in accordance with the appended claims when read in light of the foregoing specification.

I claim:

1. A seat belt retractor for installation in a vehicle having a longitudinally extending axis, comprising:
    a substantially rigid frame;
    winding means supported for movement in said frame in winding and unwinding directions and including a rotatable shaft;
    locking means supported in said frame for locking said winding means against movement in said unwinding direction;
    a retraint element connected to said winding means and movable towards and away from said frame as said winding means moves in its winding and unwinding directions, respectively; and
    mounting means connected to said frame for mounting said frame to the vehicle, so that the axis of rotation of said shaft is substantially parallel to the longitudinal axis of the vehicle,
    said mounting means having an area of less structural rigidity than said frame so that when crash forces which are generally parallel to the axis of rotation of said shaft are transmitted along said restraining means to said frame, said mounting means distorts and permits said frame to align itself toward the crash forces, whereby the structural integrity of said frame is maintained for higher crash forces.

2. The retractor of claim 1 wherein said mounting means and frame are separately constructed.

3. The retractor of claim 1 wherein said mounting means comprises a flange extending substantially parallel to the axis of rotation of said shaft.

* * * * *